Patented Oct. 11, 1938

2,133,072

UNITED STATES PATENT OFFICE

2,133,072
DYESTUFFS OF THE ANTHRIMIDE SERIES

Earl E. Beard, South Milwaukee, Wis., assignor to E. I. du Pont de Nemours & Company, Wilmington, Del., a corporation of Delaware No Drawing. Application April 22, 1937, Serial No. 138,375

3 Claims. (Cl. 260—368)

This invention relates to the preparation of new and valuable dyestuffs of the anthrimide series, and has for its object the preparation of new alpha-beta-anthrimides containing the nucleus of 1-aminoanthraquinone-6-carboxylic acid, which dye and print in red-brown shades of excellent fastness properties.

While a number of the alpha-beta type anthrimide compounds have been prepared, it is recognized that in the main they are used commercially only for dyeing since most of these products exhibit poor printing properties.

I have found that by combining beta-halogen-anthraquinones with 1-aminoanthraquinone-6-carboxylic acid substituted in the acid radical by an arylamine group, anthrimide dyestuffs are obtained which dye in red-brown shades and which can be used for either dyeing or printing. The beta-halogen-anthraquinones employed may contain simple monovalent substituents such as halogen, benzoylamino groups, etc., and the arylamine substituted in the carboxy radical of the 1-aminoanthraquinone-6-carboxylic acid may be of the benzene or anthraquinone series including the higher ring condensation products of anthraquinone. While the general condensation reaction employed in the preparation of these compounds is not itself new, it has been found that where the 1-aminoanthraquinone-6-carboxylic acid nucleus is introduced into the anthrimide molecule by condensing the same with a beta-halogen-anthraquinone compound desirable dyestuffs are obtained which dye cellulose fibers in red-brown shades, and that the printing properties of these new dyes are superior to those ordinarily obtained by the condensation of alpha-aminoanthraquinones with beta-halogen-anthraquinones.

The following examples are given to more fully illustrate a method for preparing these new dyestuffs. The parts used are by weight.

Example 1

7 parts of 1-amino-6-anthraquinonecarboxylic acid anilide are heated with 3 parts of anhydrous sodium acetate, 0.5 part of copper acetate, 5.2 parts of 2-chloroanthraquinone and 100 parts of nitrobenzene at 200 to 206° C. for 12 hours. The reaction mixture is cooled to 80° C., diluted in solvent naphtha, filtered and washed with solvent naphtha, alcohol, and water, in turn. The alpha-beta-dianthrimide thus obtained gives a bright bluish green color in sulfuric acid and dyes cotton in reddish brown shades from a dark reddish brown vat.

1-benzoylamino-6-chloroanthraquinone may be substituted for the 2-chloroanthraquinone used in this example.

Example 2

24 parts of 1-aminoanthraquinonyl-6,1'-carbonylimino-5'-aminoanthraquinone, 25 parts of 2-chloroanthraquinone, 0.5 part of basic copper acetate and 12 parts of soda ash are mixed in molten naphthalene, and the mixture is heated to 200 to 210° C. for 20 hours. The melt is cooled to 140° C., diluted with o-dichlorobenzene and filtered while still hot. The filter cake may be either steamed solvent free or washed with alcohol and water. The alpha-beta-anthrimide compound is a brownish red solid giving a yellowish green color in sulfuric acid. It can be used without further purification for dyeing or printing in red-brown shades. If desired, it can be purified by dichromating in dilute sulfuric acid or by bleaching with sodium hypochlorite.

Example 3

10 parts of 1-aminoanthraquinonyl-6,1'-carbonylimino-5'-aminoanthraquinone are condensed with 15.5 parts of 1-benzoylamino-6-chloroanthraquinone and 150 parts of nitrobenzene in the presence of 5 parts of anhydrous sodium acetate and 0.5 part of copper acetate. The condensation is complete after 12 hours at 200 to 206° C. The product is isolated by the method disclosed in Example 1 and gives a bright blue color in sulfuric acid. It dyes cotton in very reddish brown shades from a dark reddish brown vat and shows excellent tinctorial strength.

Example 4

By the same procedure described in the above examples 1 mole of 2-chloroanthraquinone may be condensed with 1-aminoanthraquinonyl-6,1'-carbonylimino-5'-benzoylaminoanthraquinone to give a compound having the following formula

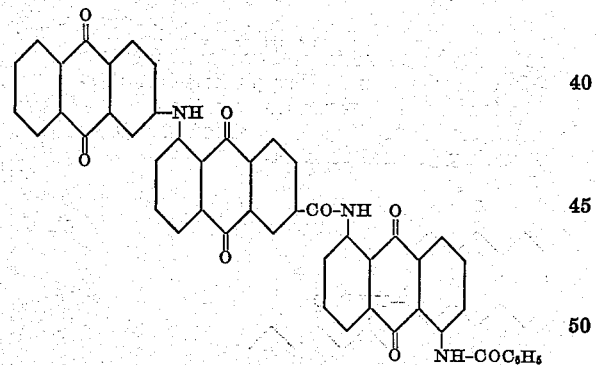

which gives an olive green sulfuric acid solution color and dyes cotton in red-brown shades.

Example 5

1 mole of 1-benzoylamino-6-chloroanthraquinone is condensed with 1 mole of 1-aminoanthraquinonyl-6,1'- carbonylimino-5'- benzoylaminoanthraquinone by the procedure described in the above examples and gives a product having the following general formula

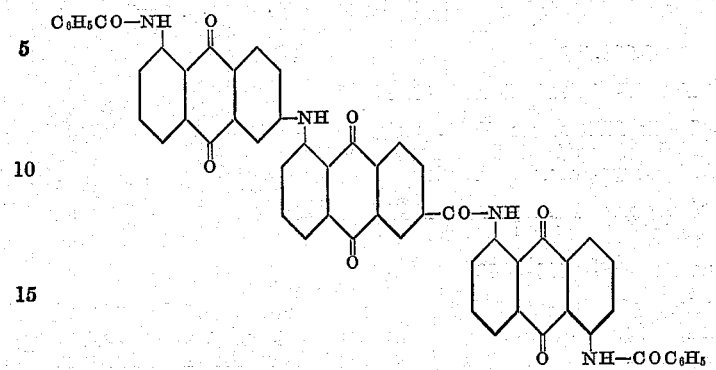

which gives a blue color in sulfuric acid and dyes cotton in red-brown shades.

*Example 6*

1 mole of 2,6-dichloroanthraquinone condensed with 2 moles of 1-aminoanthraquinonyl-6,1'-carbonylimino-5'-benzoylaminoanthraquinone by the process described above gives a product having the following general formula

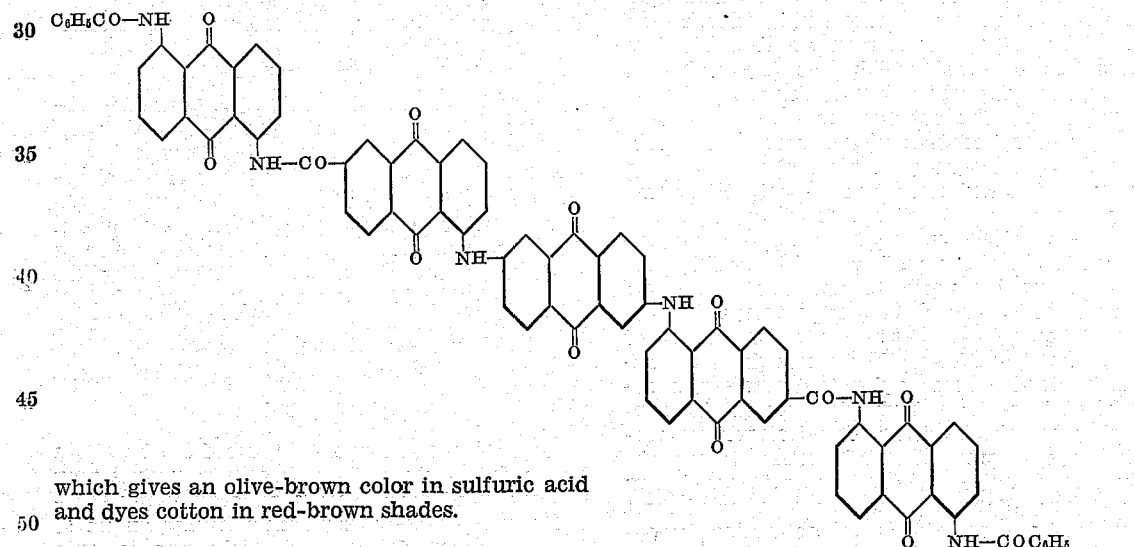

which gives an olive-brown color in sulfuric acid and dyes cotton in red-brown shades.

*Example 7*

On condensation of 1 mole of 2-chloroanthraquinone with 1 mole of 1-aminoanthraquinonyl-6,5'-carbonyliminoanthraquinone-2',1'(N)-benzacridone by the procedure described in the above examples, a product is obtained which has the following general formula

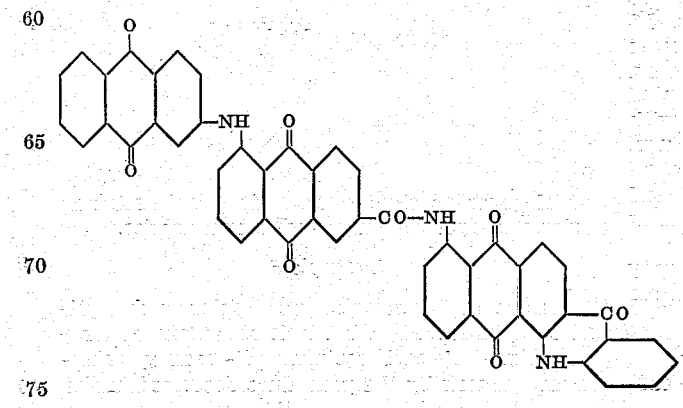

which gives a yellow-brown color in sulfuric acid and dyes cotton in red-brown shades.

In place of the 2-chloroanthraquinones used in the above examples, the 2-bromo compounds may be employed and the condensation of the beta-halogen-anthraquinones with the alpha-aminoanthraquinone compounds may be effected by any of the processes generally employed in the preparation of anthrimide compounds.

The 1-amino-6-anthraquinonecarbonylaminoaryl compounds may be prepared by condensing arylamino compounds with 1-nitroanthraquinone-6-carbonyl halides, as described in U. S. Patent 2,001,701, with subsequent reduction of the nitro group to the corresponding amine, as described in U. S. Patent 2,001,702.

What I claim is:
1. Compounds of the formula

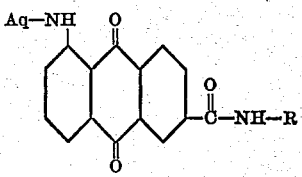

wherein Aq stands for an anthraquinone group attached to the imino radical in the beta position and R stands for an aromatic radical of the class consisting of those of the benzene and the anthraquinone series.

2. The compounds of the formula

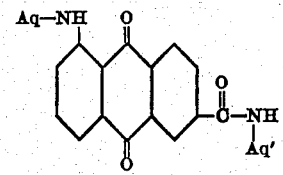

wherein Aq and Aq' stand for anthraquinone groups and wherein Aq is attached to the imino linkage in the beta position.

3. The compound of the formula

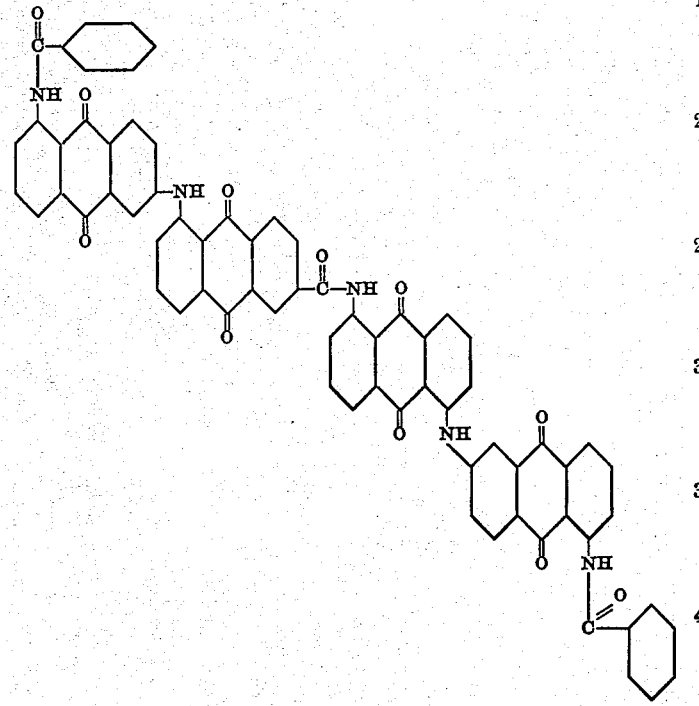

EARL E. BEARD.